Nov. 19, 1935.                W. H. GILLE                2,021,413
GEAR TRAIN RELEASE
Filed Nov. 12, 1932
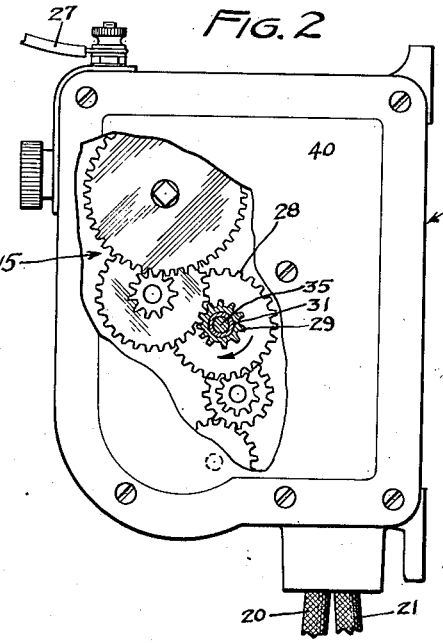
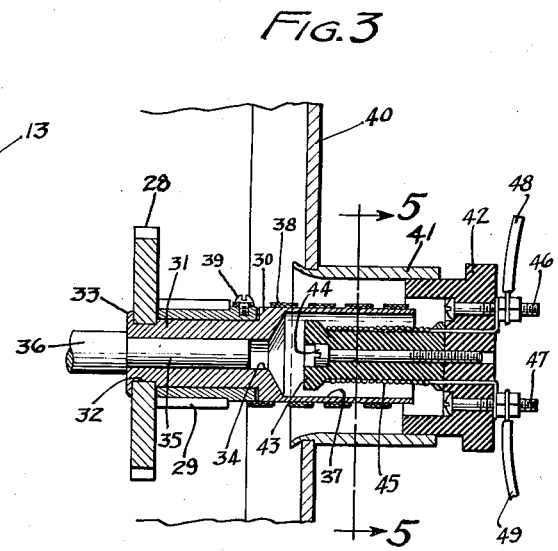
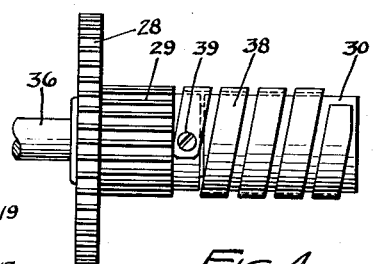
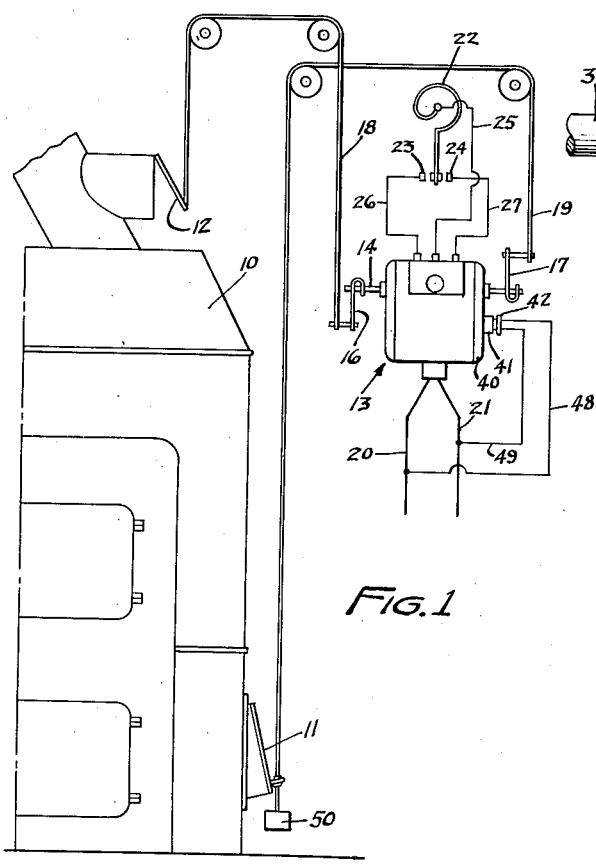
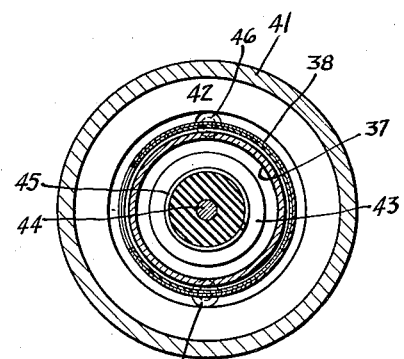
Inventor
WILLIS H. GILLE
By Paul, Paul & Moore
ATTORNEYS Patented Nov. 19, 1935

2,021,413

UNITED STATES PATENT OFFICE 2,021,413

GEAR TRAIN RELEASE

Willis H. Gille, St. Paul, Minn., assignor to Minneapolis-Honeywell Regulator Company, Minneapolis, Minn., a corporation of Delaware Application November 12, 1932, Serial No. 642,413

18 Claims. (Cl. 236—16)

For a long period of years in the art of automatic temperature control it has been usual to electrically operate dampers, valves and other similar control means from a first position to a second position when a thermostatic element or other device responsive to a physical condition engaged a first contact and to return the controlled means to its original position when the condition responsive device engaged a second contact upon a predetermined change in the physical condition to which it responded. It has been usual to arrange these prior art mechanisms in such a manner that the controlled means is electrically operated from either of its positions to the other of its positions, the electrical power to the controlling means being discontinued while the controlled means is in either of its extreme positions. In other words the controlled means is in a condition of stable equilibrium when in either of its extreme positions and requires the application of electrical power to move it to its other position and vice versa.

In the case of a gas valve, for instance, with the valve in open position to allow flow of gas to a house heating furnace, if the electrical power should fail, it would be impossible to automatically close the valve until the electrical power had been restored. As a result, if the electrical power remained off too long a time, the furnace and/or the space to be heated were very often greatly overheated, causing discomfort to the occupants of the space and sometimes causing serious damage to the furnace.

To overcome these difficulties, it has been proposed to use a magnetically actuated device which normally is continuously energized from the source of electrical power, this magnetically actuated device when energized allowing the normal operation of the valve by the condition responsive device and electrical control mechanism, but when deenergized by a failure of the electrical power, operating to close the valve even though the condition responsive device is in such a position as to normally maintain the valve in open position.

This arrangement was a great improvement over the prior art devices in that it prevented overheating of the furnace and/or space to be heated and thereby removed the possibility of damaging the furnace by overheating as the result of a failure of electrical power since the valve was immediately closed upon failure of electrical power. This power failure arrangement, however, operated on even momentary failure of electrical power so that the valve was closed even though the electrical power were only off for an instant. It will be obvious that there is no necessity of closing a gas valve if the power is off for a very short period since serious overheating of the furnace and/or space could not take place in so short time. In many instances the valve would be closed by reason of a short power failure when the space was below the desired temperature, and this closing of the valve would cause the space to become even colder to the great discomfort of the occupants.

One of the principal objects of the present invention is the provision of a power failure device in an automatic electrical control system of that type requiring electrical power to move it from any of its positions to another position, the power failure device comprising an electrically operated time delay device that will only operate if the power failure lasts for a predetermined length of time.

In the specific embodiment of the invention to be hereinafter described, the invention has been shown as applied to a standard make of electrically operated damper motor which automatically moves the dampers of a coal burning furnace to draft inducing or draft shut-off positions in response to changes in room temperature. If the dampers should be in draft inducing position at the time of a failure in electrical power, they will remain in that position until the failure of electrical power has lasted for more than a very short period. Specifically the invention provides a connecting mechanism for connecting two parts of a gear train in operative relation as long as there is a supply of electrical power and until the supply of electrical power has been discontinued for a reasonable length of time. In the present instance, the connecting mechanism takes the form of an electrical heating element and an helically coiled bimetallic element one end of which is secured to one shaft of a gear train, the remaining portion of the bimetallic element being wrapped around another shaft of the gear train in such a manner that it grips the latter shaft when heated by the electrical heating element. The electrical heating element is connected to a source of electrical power at all times to maintain an operative connection between the parts of the gear train. If the electrical power should fail, the bimetallic element will begin to cool but the operative connection between the parts of the gear train will remain in effect until the bimetallic element has cooled to a considerable extent. If the electrical power should return in a relatively short time, the bimetallic element will not have cooled sufficiently to disrupt the operative connection between the parts of the gear train. In this manner a non-operation of the power failure device upon a short failure of electrical power is obtained.

This arrangement of parts also permits of a one-way driving connection between the two shafts when the bimetallic element is heated by the electrical heating element and a further object of the invention is the provision of a novel one-way connection between a driving member and a driven member.

A further object of the invention is the provision of an actuator which drives a crank arm through the medium of a one-way connection, the crank arm being normally biased to one of its dead center positions and controlling a damper or other fluid flow controlling element. By this arrangement the damper will be driven by the actuator until the crank arm passes through its other dead center position whereupon the one-way connection will permit the biased crank arm and damper to quickly move to their original positions. In this manner a slow opening and quick closing of the damper may be simply accomplished.

For a more complete understanding of the invention, reference may be had to the following description and accompanying drawing in which:

Fig. 1 is a schematic view showing a standard electrically operated damper motor, under the control of a room thermostat, applied to the dampers of a coal burning furnace and with my invention applied thereto, Fig. 2 is a side view of the damper motor of Fig. 1 with parts broken away to show the location of my novel gear release device in respect to the gear train of the damper motor, Fig. 3 is a sectional view of the gear train release or power failure device, Fig. 4 is a plan view of the driving and driven shafts with my one-way connecting means applied thereto, and Fig. 5 is an enlarged sectional view taken on about line 5—5 of Fig. 3.

Referring to the drawing, a coal burning furnace of standard construction indicated at 10 is provided with the usual draft damper 11 and check damper 12. A damper motor having my invention applied thereto is generally indicated at 13, this damper motor being of the usual well-known construction in all other respects. The damper motor 13 includes a rotary electrical motor (not shown) which drives a crank shaft 14 through suitable gear reduction generally indicated at 15. A pair of crank arms 16 and 17 are secured to the crank shaft 14 for rotation thereby. Cables 18 and 19 respectively connect crank arm 16 with check damper 12 and crank arm 17 with draft damper 11. Line wires 20 and 21 furnish power to the usual electrical motor under the control of a room thermostat 22 which is adapted to engage a contact 23 on temperature fall and a contact 24 on temperature rise. The room thermostat 22, contact 23, and contact 24 are suitably connected to the usual controlling mechanism contained within the damper motor 13 by wires 25, 26, and 27 respectively.

Damper motors of this general type are old in the art and all operate in substantially the following manner. When the temperature in the room falls, the room thermostat 22 will engage contact 23 thereby completing a circuit to the rotary electrical motor contained within the damper motor 13, so as to move crank arms 16 and 17 through a half revolution whereupon the circuit to the rotary electrical motor will be interrupted. This movement of crank arms 16 and 17 closes check damper 12 and opens draft damper 11 which increases the draft to the coal burning furnace 10 so as to increase the amount of heat being delivered to the room. Conversely, when the temperature of the room rises, room thermostat 22 engages contact 24 to again complete a circuit to the rotary motor contained in the damper motor 13 to move the crank arms 16 and 17 through another half revolution to bring the parts to the position shown in Fig. 1 wherein the check damper 12 is open and the draft damper 11 is closed thereby reducing the intensity of the fire in the furnace 10.

According to the present invention the rotary electrical motor (not shown) is not permanently connected to the crank shaft 14. In the instant embodiment of the invention this is accomplished by not permanently connecting gear 28 to pinion 29 of the gear reduction 15. A shaft 30 has a reduced portion 31 which loosely receives pinion 29. A further reduced portion 32 of the shaft 30 non-rotatably receives gear 28 after which the end of shaft 30 is peened over as shown at 33. The shaft 30 is additionally provided with a relatively small bore 34 which extends through the reduced portions 31 and 32 and non-rotatably receives the reduced end 35 of a shaft 36 which is journalled within the damper motor 13. The outer end of shaft 30 is provided with a relatively large bore as indicated at 37. A temperature responsive element 38, in the present case being shown as the usual bimetallic element, has one of its ends secured to pinion 29 by screw 39, the remaining portion of the bimetallic element 38 being helically coiled about the outer end of shaft 30. The case 40 of damper motor 13 is provided with an opening through which the outer end of shaft 30 extends, and the case 40 is further provided with a cylindrical extension 41 which in effect extends the case 40 around the outer end of shaft 30. A cap or closure member 42 of insulating material is received by cylindrical extension 41. A spool of insulating material 43 is secured to cap 42 by a screw 44 and extends within the bore 37 of shaft 30. An electrical heating coil 45 is wound about spool 43 and has one of its ends secured to a binding post 46 and its other end secured to a binding post 47, both of which are carried by insulating cap 42. Binding post 46 is connected to line 20 by a wire 48 and binding post 47 is connected to line 21 by a wire 49. It will be noted that the heating element 45 is connected directly to the source of electrical power for continuous energization thereby as long as electrical energy is available.

*Operation*

The heater coil 45 being directly connected to the line wires 20 and 21 is normally continuously energized and gives off heat to the shaft 30 and consequently to the bimetallic element 38. Heating of bimetallic element 38 causes it to coil tightly about the extended end of shaft 30 and to tightly grip the same. The gear 28 when rotated by the electrical motor, turns in a clockwise direction as viewed in Fig. 2 so that the shaft 30 tends to wind the bimetallic element 38 even more tightly which action results in a clockwise rotation of pinion 29 as viewed in Fig. 2. The draft damper 11 is provided with a weight 50 which tends to close the draft damper 11 and open the check damper 12. When the room temperature drops causing room thermostat 22 to engage contact 23, the rotary electrical motor (not shown) will rotate crank arms 16 and 17 through a half revolution to open the draft damper 11 and check damper 12. This movement of crank shaft 14 rotates crank arm 17 until it extends practically straight downward. If the crank arm 17 were moved until it extended straight downward, it would be on one of its dead center positions, and the weight 50 would be unable to move the crank arm 17 and associated parts in the reverse direction when the crank arm 17 and associated parts were released for movement by the power failure device as to be hereinafter described. This is the reason that the crank arm 17 is moved to a position just short of its dead center position on a call for heat. The crank arm 17 being in a position just short of dead center, the weight 50 constantly tends to rotate crank shaft 14 and the associated crank arms 16 and 17 in the reverse direction to assume their original positions as shown in Fig. 1, but is incapable of doing so because these parts are operatively connected to the rotary motor through the gear reduction 15 which includes the heat operated connecting means hereinbefore described. If the supply of electrical power should fail while the dampers are in draft inducing position, the room thermostat 22 will be unable to automatically move them back to their initial position. If the power should remain off for a considerable length of time, both the room and the furnace may become over-heated causing discomfort to the occupants of the room and serious injury to the furnace. With my present invention applied to the damper motor 13 however, a failure of electrical energy will deenergize heating element 45 whereupon bimetallic element 38 will begin to cool. After a predetermined time the bimetallic element 38 will have cooled sufficiently to loosen its grip upon shaft 30 whereupon weight 50 will close draft damper 11 and open check damper 12 by rotating crank arms 16 and 17, crank shaft 14 and that part of the gear reduction 15 which is between pinion 29 and crank shaft 14 in the reverse direction. When the electrical power fails the bimetallic element 38 will not immediately cool sufficiently to loosen its grip on shaft 30 so that if the power should merely fail momentarily the driving connection between the rotary motor and the crank shaft 14 will not be interrupted and the draft damper 11 and check damper 12 will remain in their draft inducing position.

The helically coiled bimetallic element 38 will only provide a one-way driving connection between gear 28 and pinion 29. Therefore, when the room temperature rises and room thermostat 22 engages contact 24, as soon as crank arm 17 has been moved through its dead center position the weight 50 will cause a quick movement of the draft damper 11 and check damper 12 to the position shown in Fig. 1. The circuit for the motor will also be broken. In this manner the device may be used where it is desired to open a gas valve slowly but close it relatively quickly.

The amount of time delay produced before the driving connection is severed upon a prolonged failure of power may be predetermined by properly proportioning the mass of the bimetallic element 38 and the capacity of the heating element 45.

For details of construction of the thermostatically controlled damper motor 13, reference may be had to Shivers Pat. No. 1,707,193, wherein the same type of motor is used in an oil burner control system.

From the foregoing description it will be apparent that by my invention I have provided a novel power failure mechanism by which a damper or other fluid flow controlling element may be allowed to move to its closed position upon a failure in the electrical power which supplies the normal automatic controlling mechanism. This power failure mechanism, however, is constructed in such a manner that it does not operate to close the damper or other fluid flow controlling element on an instantaneous power failure, but only operates if the power failure lasts for a predetermined length of time.

It will be obvious that the novel connecting mechanism of my invention while having particular utility for power failure purposes is capable of being used any place wherein it is desired to provide an operative connection between a driving member and a driven member.

While a particular embodiment of the invention has been herein described I am aware that various modifications and changes may be made in the details and I therefore intend to be limited only in the purview of the appended claims.

I claim as my invention:

1. A device of the class described, comprising, in combination, a member to be actuated, an electrically operated actuator which must be energized to move the actuated member from any position to another position, means associated with the actuated member tending to move the same to a predetermined position, said means being incapable of so moving the actuated member when it is connected to the electrically operated actuator, a source of power for the electrically operated actuator, and connecting means for connecting said electrically operated actuator and said actuated member, the connecting means including an electrically operated time delay device connected to said source of power for constant energization thereby as long as electrical power is available therefrom, whereby said connecting means operates to disconnect the actuator and actuated member if the source of power fails for a predetermined length of time.

2. A device of the class described, comprising, in combination, a member to be actuated, an electrically operated actuator therefor which must be energized to move the same from any position to another position, a source of electrical energy for the electrically operated actuator, means tending to move said actuated member to a predetermined position but incapable of so doing when the actuated member is operatively connected to the electrically operated actuator, and an operative connection between the electrically operated actuator and the actuated member, said connection including a heat responsive element for completing the connection when hot and an electrical heating element connected directly to the source of electrical energy for heating said heat responsive element, whereby the operative connection will be maintained for a short period if the supply of electrical energy is interrupted.

3. A device of the class described, comprising, in combination, a member to be actuated, an electrically operated actuator therefor which must be energized to move the same from any position to another position, a source of electrical energy for the electrically operated actuator, means tending to move said actuated member to a predetermined position but incapable of so doing when the actuated member is operatively connected to the electrically operated actuator, and an operative connection between the electrically operated actuator and the actuated member, said connection including a bimetallic element for completing the connection when hot and an electrical heating element connected directly to the source of electrical energy for heating said bimetallic element, whereby the operative connection will be maintained for a short period if the supply of electrical energy is interrupted.

4. A device of the class described, comprising, in combination, a member to be actuated, an electrically operated actuator therefor which must be energized to move the same from any position to another position, a source of electrical energy for the electrically operated actuator, means tending to move said actuated member to a predetermined position but incapable of so doing when the actuated member is operatively connected to the electrically operated actuator, and an operative connection between the electrically operated actuator and the actuated member, said connection including a driving element, a driven element, a heat responsive element secured to one of said elements and coiled about the other of said elements for gripping the same when hot, and an electrical heating element connected directly to the source of electrical energy for heating said heat responsive element, whereby the operative connection will be maintained for a short period of time if the supply of electrical energy is interrupted.

5. A fluid flow controlling mechanism of the class described, comprising, in combination, a fluid flow controlling element, an electrically operated rotary motor for actuating said element, a source of electrical energy for said motor, a connection between said motor and fluid flow controlling element, said connection including an electrically operable time delay device for completing the connection when energized and connected to the source of electrical energy for continuous energization thereby as long as electrical energy is available, and means tending to move said fluid flow controlling element to one of its extreme positions but incapable of so moving the same when it is connected to the motor, whereby said motor must be energized to move the fluid flow controlling element from any position to another position and whereby said fluid flow controlling element will move to said extreme position upon failure of the electrical energy source for a predetermined length of time.

6. A fluid flow controlling mechanism of the class described, comprising, in combination, a fluid flow controlling element, an electrically operated rotary motor for actuating said element, a source of electrical energy for said motor, a connection between said motor and fluid flow controlling element, said connection including a heat responsive element for completing the connection when hot and an electrical heating element for heating the heat responsive element connected to the source of electrical energy for continuous energization thereby as long as electrical energy is available, and means tending to move said fluid flow controlling element to one of its extreme positions but incapable of so moving the same when it is connected to the motor, whereby said motor must be energized to move the fluid flow controlling element from any position to another position and whereby said fluid flow controlling element will move to said extreme position upon failure of the electrical energy source for a predetermined length of time.

7. A fluid flow controlling mechanism of the class described, comprising, in combination, a fluid flow controlling element, an electrically operated rotary motor for actuating said element, a source of electrical energy for said motor, a connection between said motor and fluid flow controlling element, said connection including a bimetallic element for completing said connection when hot and an electrical heating element for heating the bimetallic element connected to the source of electrical energy for continuous energization thereby as long as electrical energy is available, and means tending to move said fluid flow controlling element to one of its extreme positions but incapable of so moving the same when it is connected to the motor, whereby said motor must be energized to move the fluid flow controlling element from any position to another position and whereby said fluid flow controlling element will move to said extreme position upon failure of the electrical energy source for a predetermined length of time.

8. A fluid flow controlling mechanism of the class described, comprising, in combination, a fluid flow controlling element, an electrically operated rotary motor for actuating said element, a source of electrical energy for said motor, a connection between said motor and fluid flow controlling element, said connection including a driving member, a driven member, a heat responsive element secured to one of said members and adapted to wrap itself tightly around the other of said members when heated to complete the connection of said members, and an electrical heating element for heating said heat responsive element connected to the source of electrical energy for continuous energization thereby as long as electrical energy is available, and means tending to move said fluid flow controlling element to one of its extreme positions but incapable of so moving the same when it is connected to the motor, whereby said motor must be energized to move the fluid flow controlling element from any position to another position and whereby said fluid flow controlling element will move to said extreme position upon failure of the electrical energy source for a predetermined length of time.

9. A fluid flow controlling mechanism of the class described, comprising, in combination, an electrically operated actuating mechanism, a fluid flow controlling element, a gear train connecting the former to the latter, said gear train including a driving member, a driven member, one of said members being hollow, a heat responsive element connected to one of said members and adapted to tightly coil about the other of said members when heated to operatively connect said members, and an electrical heating element stationarily mounted and extending into the hollow member for heating the heat responsive element when energized by a source of electrical energy.

10. A fluid flow controlling mechanism of the class described, comprising, in combination, an electrically operated actuating mechanism, a fluid flow controlling element, a gear train connecting the former to the latter, said gear train including a driving member, a driven member, one of said members being hollow, a heat responsive element connected to one of said members and adapted to tightly coil about the other of said members when heated to operatively connect said members, and an electrical heating element stationarily mounted and extending into the hollow member for heating the heat responsive element when energized by a source of electrical energy, and means tending to close the fluid flow controlling element but incapable of so doing when the same is connected to the actuating mechanism.

11. A fluid flow controlling mechanism of the class described, comprising, in combination, a fluid flow controlling element biased to one position, a crank arm connected to said element, an actuator, and a one-way driving connection between the actuator and crank arm whereby the fluid flow controlling element may be moved against its bias by the actuator, one-way connection and crank arm until the latter passes through its dead center position whereupon the biased fluid flow controlling element will be permitted by the one-way connection to quickly move the crank arm to its other dead center position.

12. A fluid flow controlling mechanism of the class described, comprising, in combination, a fluid flow controlling element, a crank arm connected thereto, means tending to move the fluid flow controlling element to one of its extreme positions and the crank arm to one of its dead center positions, an actuator, and a one-way driving connection between the actuator and crank arm whereby the crank arm may be driven by the actuator to move the fluid flow control element until the crank arm passes through its other dead center position whereupon said means will be permitted by the one-way connection to quickly move the fluid flow control element and crank arm to their original positions.

13. A fluid flow controlling mechanism of the class described, comprising, in combination, a fluid flow controlling element, a crank arm connected thereto, means tending to move the fluid flow controlling element to its closed position and the crank arm to one of its dead center positions, a rotatable actuator, and a one-way driving connection between the actuator and crank arm whereby the crank arm may be driven by the actuator to its other dead center position to open the fluid flow controlling element, the one-way connection permitting the crank arm and fluid flow controlling element to be quickly moved to their original positions by said means when the crank arm is driven through its last mentioned dead center position.

14. A fluid flow controlling mechanism of the class described, comprising, in combination, a fluid flow controlling element, a crank arm connected thereto, means tending to move the fluid flow controlling element to its closed position and the crank arm to one of its dead center positions, a rotatable actuator, a reduction gear train connecting the actuator and crank arm and including a one-way driving connection whereby the crank arm may be driven to its other dead center position by the actuator to move the fluid flow controlling element to its open position, the one-way driving connection permitting the crank arm and fluid flow controlling element to be quickly moved to their original positions by said means when the crank arm is driven through its last mentioned dead center position.

15. A fluid flow controlling mechanism of the class described, comprising, in combination, a fluid flow controlling element, a crank arm connected thereto, means biasing the crank arm to one of its dead center positions and the fluid flow controlling element to its closed position, a rotary electrical motor, a source of electrical energy therefor, a reduction gear train connecting said motor to the crank arm, said reduction gear train including an electrically operated one-way driving connection constantly energized by the source of electrical energy as long as such energy is available, means for energizing said motor for driving said crank arm substantially to its other dead center position to open the fluid flow controlling element, said electrically operated one-way driving connection being released upon a failure of electrical energy to permit said biasing means to move the crank arm in the reverse direction to its original position to close the fluid flow controlling element, and means for energizing said motor to drive the crank arm through its last mentioned dead center position, the one-way connection thereupon permitting said biasing means to further rotate the crank-arm in the same direction to quickly close said fluid flow controlling element.

16. A fluid flow controlling mechanism of the class described, comprising, in combination, a fluid flow controlling element, a crank arm connected thereto, means biasing the crank arm to one of its dead center positions and the fluid flow controlling element to its closed position, a rotary electrical motor, a source of electrical energy therefor, a reduction gear train connecting said motor to the crank arm, said reduction gear train including a heat operated one-way driving connection, an electrical heating element therefor connected directly to the source of electrcal energy for energization thereby as long as electrical energy is available, means for energizing the motor to rotate the crank arm substantially to its other dead center position to open the fluid flow controlling element, and means for energizing the motor for subsequently rotating the crank arm through the last mentioned dead center position, said one-way connection then permitting the biasing means to quickly rotate the crank arm to its original position to close the fluid flow controlling element, a failure in electrical power while the fluid flow element is in open position allowing disconnection of said heat operated one-way connection, whereby the biasing means rotates the crank arm in the reverse direction to its original position to close the fluid flow controlling element.

17. In combination, an electrical prime mover, an actuated member, means connecting the prime mover and actuated member to move the latter with the former, delayed action electrical means controlling said connecting means, and a common source of power for said prime mover and delayed action means.

18. In combination with an electrical prime mover and an actuated member, means having at least a portion thereof operative at one set of temperatures and inoperative at another set of temperatures for connecting the same, an electrical heating element for said connecting means to control the operability thereof, and electrical circuit connections to a common source of power for said element and prime mover.

WILLIS H. GILLE.